United States Patent
Papadogiannis et al.

(10) Patent No.: US 9,059,752 B2
(45) Date of Patent: Jun. 16, 2015

(54) MULTICELLULAR COOPERATIVE COMMUNICATIONS IN A DECENTRALIZED NETWORK

(75) Inventors: Agisilaos Papadogiannis, Leeds (GB); Eric Hardouin, Paris (FR); David Gesbert, Roquefort les Pins (FR)

(73) Assignee: Orange, Paris (FR)

( * ) Notice: Subject to any disclaimer, the term of this patent is extended or adjusted under 35 U.S.C. 154(b) by 762 days.

(21) Appl. No.: 13/002,100

(22) PCT Filed: Jun. 26, 2009

(86) PCT No.: PCT/FR2009/051227
§ 371 (c)(1),
(2), (4) Date: Dec. 30, 2010

(87) PCT Pub. No.: WO2010/004179
PCT Pub. Date: Jan. 14, 2010

(65) Prior Publication Data
US 2011/0110414 A1 May 12, 2011

(30) Foreign Application Priority Data

Jun. 30, 2008 (FR) ..................... 08 54420

(51) Int. Cl.
*H04W 4/00* (2009.01)
*H04B 7/04* (2006.01)
*H04W 72/12* (2009.01)
*H04W 84/18* (2009.01)
*H04W 72/08* (2009.01)

(52) U.S. Cl.
CPC .......... *H04B 7/0417* (2013.01); *H04W 72/1278* (2013.01); *H04W 84/18* (2013.01); *H04W 72/082* (2013.01)

(58) Field of Classification Search
CPC ..................................................... H04W 84/18
USPC ........................................................ 370/338
See application file for complete search history.

(56) References Cited

U.S. PATENT DOCUMENTS

| | | | |
|---|---|---|---|
| 2006/0172739 A1* | 8/2006 | Wigard et al. ................ | 455/442 |
| 2008/0076370 A1 | 3/2008 | Kotecha et al. | |
| 2008/0167064 A1* | 7/2008 | Bar-Ness et al. ............. | 455/522 |
| 2009/0010234 A1* | 1/2009 | Li et al. ......................... | 370/338 |
| 2009/0157378 A1* | 6/2009 | Boldyrev et al. .............. | 703/22 |

FOREIGN PATENT DOCUMENTS

WO    WO 2007/128135 A1    11/2007

OTHER PUBLICATIONS

IEEE C802.16m-07/162 "Collaborative MIMO Based on Multiple Base Station Coordination" by Song et al. on Aug. 29, 2007.*

(Continued)

*Primary Examiner* — Ayaz Sheikh
*Assistant Examiner* — Hai-Chang Hsiung
(74) *Attorney, Agent, or Firm* — Drinker Biddle & Reath LLP

(57) ABSTRACT

In a multicellular cooperative radio communications method, the terminals estimate and communicate to all the access points of a cooperating cluster of access points information on the transmission channels between them and each access point of the cluster. The access points include homologous processor for scheduling the servicing of the terminals and operating in accordance with a particular criterion common to all the access points. Finally, the servicing of the terminals is effected jointly by said access points, in an order determined by the processor, using transmission parameters on the basis of the information on the transmission channels transmitted by the terminals.

13 Claims, 3 Drawing Sheets

(56) References Cited

OTHER PUBLICATIONS

IEEE C802.16m-08/337 "Signaling for Base Station Cooperation" by Tao et al. on May 5, 2008.*

Alcatel Shanghai Bell et al., "Collaborative MIMO for LTE-A downlink," 3GPP Draft; R1-082501_DL Collaborative MIMO, 3$^{rd}$ Generation Partnership Project (3GPP), Mobile Competence Centre; 650, Route Des Lucioles, F-06921 Sophia-Antipolis Cedex, France; vol. tsg_ran\WG1_RL1\TSGR1_53b\Docs, no. Warsaw, Poland, pp. 1-6 (Jun. 24, 2008).

* cited by examiner

MULTICELLULAR COOPERATIVE COMMUNICATIONS IN A DECENTRALIZED NETWORK

CROSS-REFERENCE TO RELATED APPLICATIONS

This application is the U.S. national phase of the International Patent Application No. PCT/FR2009/051227 filed Jun. 26, 2009, which claims the benefit of French Application No. 08 54420 filed Jun. 30, 2008, the entire content of which is incorporated herein by reference.

FIELD OF THE INVENTION

The invention is in the field of wireless and mobile radio communications, including WIMAX, WIFI, 4G, IEEE 802.11, IEEE 802.16 networks and in particular IEEE 802.16m networks.

BACKGROUND

In the context of "multicellular cooperative" communications, terminals receive payload signals from a plurality of base stations cooperating with one another.

This technique is very promising but is still open to improvement, notably to simplify its use.

Multicellular cooperative communications enable terminals to receive payload signals from a plurality of base stations in a coordinated manner that advantageously minimizes interference between cells. Intercellular interference is the main reason for the limited spectral efficiency of cellular systems. Provision is made for a few base stations that exchange information efficiently to cooperate with one another. The cooperating base stations form what is known as a cooperation cluster.

Apart from reducing intercellular interference, transmission by a plurality of base stations also offers advantages in terms of robustness against:
  shadowing; and
  fast fading type signal losses;
because the transmission channels between a terminal and different base stations need not be correlated. This is referred to as macro-diversity.

Multicellular cooperation is a multiple-input multiple-output (MIMO) multi-user technique enabling the base stations of the cooperation cluster to act as a single array of distributed antennas. One of the most promising uses of this distributed array with a view to increasing the overall data rate of the cell is providing space-division multiple access (SDMA), i.e. servicing a plurality of users simultaneously using the same block of resources. A block of resources represents the unit quantity of radio resources that a user may be allocated.

For example, in the code-division multiple access (CDMA) technology, a block of resources may be defined by:
  a carrier frequency;
  a spreading code; and
  a duration.

In orthogonal frequency-division multiple access (OFDMA) technology, a block of resources may be a set of subcarriers during a set of orthogonal frequency-division modulation (OFDM) symbols, known as a chunk.

Macro-diversity has already been used for a few years by Universal Mobile Telecommunications System (UMTS) technology to improve performance for users at the edges of cells. UMTS technology does not use SDMA, however: the base stations that cooperate transmit to only one user at a time on one frequency and using a given code.

Linear pre-coding (using adaptive beams) and the edge information insertion technique known as dirty paper coding are two techniques for implementing SDMA on the downlink (from the station to the terminal), as opposed to the uplink (from the terminal to the base station).

Linear precoding may also be effected on the basis of fixed beams (this is known as the grid-of-beams technique). Linear precoding is a transmission technique that may prove advantageous in practice because it represents a good compromise between performance and complexity. In each transmission time interval (TTI), the base stations of the cooperation cluster may service at most as many terminals for each block of resources as the total number of antennas in the cluster. The TTI is the unit time interval during which a user may be assigned radio resources. SDMA may be used on the downlink if the base stations have channel state information (CSI) in respect of the transmission channels on the downlink between the antennas of the base stations and the antennas of each user. This CSI may consist of the coefficients of the transmission channels, for example.

However, linear precoding may also be used in the context of multicellular cooperative communications without SDMA, a single terminal then being serviced in each TTI. The user being serviced then benefits from more power and therefore improved received signal quality, but the overall capacity of the system is generally low compared to the situation in which SDMA is used. Servicing a single terminal at a time may nevertheless be preferred if the requirement is to provide a good quality of service to some users suffering particularly unfavorable reception conditions.

In the fixed beam situation, the CSI may equally be information in respect of the beam that is the most appropriate one for the terminal, i.e. the beam that is received with the maximum power.

Moreover, packet communications systems generally require information about the quality of the channel to be made available in order to determine the appropriate combination of modulation and coding to use for transmission. This information is traditionally referred to as the channel quality indicator (CQI) and may be a signal to interference plus noise, for example. Moreover, this CQI may also be used to determine the scheduling of the terminals to be serviced.

In the present document, the general term channel information (CI) is used to designate the combination consisting of the CSI and the CQI. Below, the expression "local CI", when used with reference to a base station, refers to the CI on the transmission channels between a terminal and the antennas of that base station. The CI that is not local to a base station is the CI on the transmission channels between a terminal and a different base station.

In the context of multicellular cooperative communications on the downlink of frequency-division duplex (FDD) systems, the terminal must estimate the CI of the transmission channels between its antennas and the antennas of the base stations of the cooperation cluster with which it is associated. The CI must then be transmitted to a central entity known as the central controller (CC).

The CI may be transmitted from the terminal to the central controller using the following method: the terminal transmits over the return path to each base station of the cluster the CI local to that base station. Note that in this method a return path is necessary for each base station. Each base station then transfers the received CI to the central controller.

The central controller assembles the CI from all the terminals of the cluster and decides on the users to be serviced. This process is referred to as scheduling. The central controller also defines the transmission parameters to use on the basis of the CI from all the terminals of the cluster, for example a precoding matrix to use for linear precoding or the beam to activate for fixed beams.

The existence of a central controller for each cluster and the exchange of information between the base stations and the central controller are necessary because in the two methods referred to above each base station knows only a portion of the CI of the terminals necessary for scheduling and to define the transmission parameters.

In the prior art described in particular in the document "Collaborative MIMO Based on Multiple Base Station Coordination", Y. Song, L. Cai, K. Wu, and H. Yang, Contribution to IEEE 802.16m, IEEE C802.16m-07/162, multicellular cooperative communications are implemented in three stages.

In a first stage, each terminal estimates the transmission channels between its antennas and the antennas of each of the base stations of the cooperation cluster. For example, if each terminal has only one antenna and if there are B cooperating base stations, each of which has two antennas, each terminal estimates 2xB CSI. Similarly, each terminal estimates a CQI for each base station.

In a second stage, the terminals transmit on the return path of each base station of the cluster the CSI and CQI local to that base station using on each return path an appropriate power and an appropriate modulation and coding scheme for the base station to be able to decode the message. Note that, because they depend on the quality of the channel on the return path, the power and the modulation and coding scheme may be different on each return path. Consequently each base station of the cluster assembles local CI.

The base stations finally send the local CI to the central controller of the cluster.

In a third stage, the central controller decides on the scheduling of the users. The central controller then decides on the transmission parameters to use. It calculates a linear precoding matrix, for example. Finally, the central controller sends the information corresponding to its decisions to each base station of the cluster.

Note that in the time-division duplex (TDD) situation, as considered in the document referred to above, the first stage and the operation of sending the local CSI of the second stage are simplified because a base station may estimate the CSI of the mobiles in its cell directly. In the TDD situation, the uplink channel is identical to the downlink channel (in accordance with the principle of channel reciprocity). However, all other operations are unchanged.

Moreover, note that the document referred to above proposes to simplify multicellular cooperative communications by limiting the exchange of CI between base stations to the CQI, each base station forming a linear precoding matrix exclusively according to its local CSI. This reduction of the exchanges necessary between the base stations and the central controller simplifies the system, but at the cost of degraded performance as the intercellular interference then cannot be treated effectively.

The prior art technique, even when simplified as in the document referred to above, requires infrastructure cost that is high relative to the existing structure of cellular systems because it requires a central controller for each cooperation cluster and low-latency links between the base stations and the central controller. Furthermore, it is necessary to define new protocols in order for the cooperation cluster entities (central controller and base stations) to interwork correctly, in particular to coordinate:

the exchange between the base stations and the central controller of local CI (second stage);
information on the users selected by a scheduling unit (third stage); and
information concerning the transmission parameters (third stage).

SUMMARY

The present invention aims to improve on this situation.

To this end it proposes a method of wireless telecommunication in which an access point is adapted to transmit a signal to at least one terminal via a transmission channel. The telecommunications method is used in a system including at least:

first and second access points; and
first and second terminals that may be serviced by said first and second access points.

The first terminal is adapted to estimate first transmission channels between said first terminal and said first and second access points and the second terminal is adapted to estimate second transmission channels between said second terminal and said first and second access points.

In the method of the invention the first and second access points include corresponding processing means for scheduling the servicing of the terminals according to a predetermined criterion common to the first and second access points.

In this document, access point means either an access point of a wireless network, for example one conforming to a standard from the IEEE 802.11 family, commonly known as WIFI, or the IEEE 802.16 family or a base station of a mobile network, for example a UMTS network.

The method further includes:
a. estimation by the first terminal of said first transmission channels and by the second terminal of said second transmission channels;
b. communication to the first and second access points of a first indication concerning said first transmission channels by said first terminal and a second indication concerning said second transmission channels by said second terminal; and
c. joint servicing of said terminals by the first and second access points in an order determined by said processing means using transmission parameters on the basis of said first and second indications.

It is to be understood channel estimation may take into account the state and/or the quality of the channel. For example, it may both evaluate the state of the channel by channel coefficients or a covariance matrix associated with those coefficients, and also evaluate the quality of the channel by calculating a signal-to-interference plus noise ratio, for example. The joint servicing of a terminal by said first and second access points corresponds to the substantially simultaneous transmission of a signal to said terminal by the first and second access points. Joint service is implemented in the context of the invention without the necessity for communication between the first and second access points or between the access points and a central controller in the prior art sense.

In one implementation, the first and second access points jointly service at least two terminals simultaneously. This enables use of SDMA and thus increases the overall capacity of the system.

In one implementation, said common predetermined criterion is based on said first and second indications on the first and second channels. This makes it possible to take into account the same parameters in scheduling service by the processing means.

In one implementation:
the first and second access points respectively establish first and second lists of terminals covered by the first and second access points;
said first and second lists are classified in a common order; and
said processing means of each access point schedule successive servicing of the terminals according to their classification in the list by groups comprising at least one terminal.

A terminal is referred to as being "covered" by an access point if it is identified by the access point as having to be serviced by that access point.

In one implementation a unique number is assigned for identifying the terminals and said first and second lists are classified in an order that is a function of the numbers identifying the terminals.

In one implementation said first indication and said second indication include information on the coefficients of the transmission channels.

In one implementation said first indication and said second indication include information on the signal-to-interference plus noise ratios of the transmission channels.

In one implementation in which said first indication and said second indication include information on signal-to-interference plus noise ratios of said first and second transmission channels, said common criterion for scheduling servicing of the terminals is such that at least one terminal of which one transmission channel has a maximum ratio of signal-to-interference plus noise is serviced.

In one implementation, a cooperation cluster including at least said access points jointly servicing said terminals is defined. Said system further includes one or more access points not belonging to said cooperation cluster (and which therefore generate interference in at least one of said terminals). In such an implementation the first indication and the second indication respectively include information relating to a signal-to-interference plus noise ratio associated with the first and second terminals. The power of the signal in a signal-to-interference plus noise ratio associated with a terminal is defined as the sum of the powers received by said terminal from the access points belonging to the cooperation cluster. The power of the interference in a signal-to-interference plus noise ratio associated with a terminal is defined as the sum of the powers received by said terminal from the access points not belonging to said cooperation cluster.

The access points jointly servicing the terminals include the access points that implement cooperative communications with the terminals, notably the first and second access points.

In one implementation, said first indication and said second indication each include information on a first beam that may be rendered active by the first access point and a second beam that may be rendered active by the second access point, said first and second beams being receivable by the terminal with a maximum power.

The present invention also provides a telecommunications system including at least:
first and second access points; and
first and second terminals that may be serviced by said first and second access points.

The first terminal is adapted to estimate first transmission channels between said first terminal and said first and second access points and the second terminal being adapted to estimate second transmission channels between said second terminal and said first and second access points.

In a system of the invention the first and second access points include homologous processing means for scheduling the servicing of the terminals according to a predetermined criterion common to the first and second access points, and:
a. the first terminal estimates said first transmission channels and the second terminal estimates said second transmission channels;
b. said first terminal communicates to the first and second access points a first indication concerning the first transmission channels and the second terminal communicates to the first and second access points a second indication concerning the second transmission channels; and
c. the first and second access points jointly service the first and second terminals in an order determined by said processing means using transmission parameters on the basis of said first indication and said second indication.

The present invention also provides a module of an access point of the system described above which receives said first indication and said second indication from the terminals and includes processing means for scheduling servicing of the terminals by activating transmission channels on the basis of said first indication and said second indication.

The present invention further provides a computer program of a module of an access point of the system described above that includes instructions for executing the method described above when the program is executed by a processor. In particular such a program may prove advantageous for providing service through activating transmission channels on the basis of said first and second indications.

Thus the invention proposes to resolve the drawbacks of the prior art by enabling the use of multicellular cooperative communications without fundamentally changing the architecture of the cellular networks, i.e. with no need for a central controller or low-latency links between the access points (base stations) and the central controller.

In particular, what is relied on here is the transmission by each terminal of its CI to all of the access points (base stations) of the cooperation cluster. Each access point (base station) of the cluster thus knows the CQI and CSI of all the terminals covered by the cooperation cluster (local CI and non-local CI) and may then schedule users and define transmission parameters without needing to exchange CI with a central entity. This leads in the end to the same scheduling of service to terminals and to the same choice of transmission parameters to be used by the access points (base stations) that cooperate with each other as in the situation of using a central scheduling entity as in the prior art. Here the lack of any such entity represents a saving.

Because the selected terminals are serviced simultaneously by access points (base stations) of the cluster, the access points (base stations) operate in a synchronized manner to implement multicellular cooperative communications.

BRIEF DESCRIPTION OF THE DRAWINGS

Other features and advantages of the invention become apparent on examining the following detailed description of particular implementations and the appended drawings, in which.

DETAILED DESCRIPTION

In one implementation of the invention, the first stage referred to above in relation to the prior art may remain the same, in particular for FDD communication. In TDD communication, the first step is of no utility in a prior art implementation. It is nevertheless preferable to use it in an implementation of the invention. Thus each terminal estimates the transmission channels between its antenna(s) and the antennas of each of the base stations of the cooperation cluster. Moreover, each terminal estimates a CQI for each of the base stations of the cluster. Alternatively, each terminal estimates a single CQI representing the quality of all the channels of all the base stations of the cluster.

In the second stage, the terminals may transmit their CI on the return path to all the base stations of the cooperation cluster with appropriate power and an appropriate modulation and coding scheme so that all the base stations of the cluster are able to decode the message. Note that the return path may advantageously be the same for all the base stations of the cluster in order to limit the number of radio resource blocks needed. Accordingly, all the base stations of the cluster combine the CI from all the terminals covered by the cluster.

In the third stage, each base station decides on the scheduling of users without communicating with the other base stations of the cluster. Because all the base stations of the cluster are synchronized and use the same scheduling algorithm, they select the same terminals. Each base station then chooses the transmission parameters for each selected user without communicating with the other base stations of the cluster.

Thus multicellular cooperative communications may be implemented without requiring major changes to the existing cellular network architectures. In particular, the invention makes it possible to dispense with:
- a central controller for each cooperation cluster; and
- low-latency links between the base stations of the cluster and the central controller.

Moreover, the invention does not require a highly-complex protocol to coordinate the exchanges of data between the base stations and any central controller of the cluster.

Also, in contrast to the simplifying technique described in the prior art document referred to above, the invention makes it possible to communicate non-local CSI to the base stations of the cluster, which makes it possible to use transmission techniques that are effective against intercellular interference, such as linear precoding distributed between the antennas of the cluster.

Figure 1B:
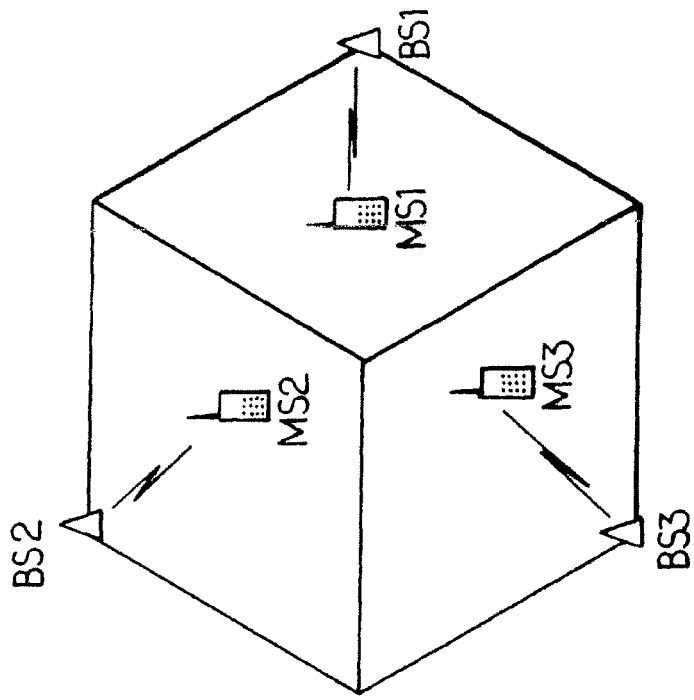
FIG. 1B illustrates the step of transmission channel estimation by terminals of the invention.
Figure 1A:
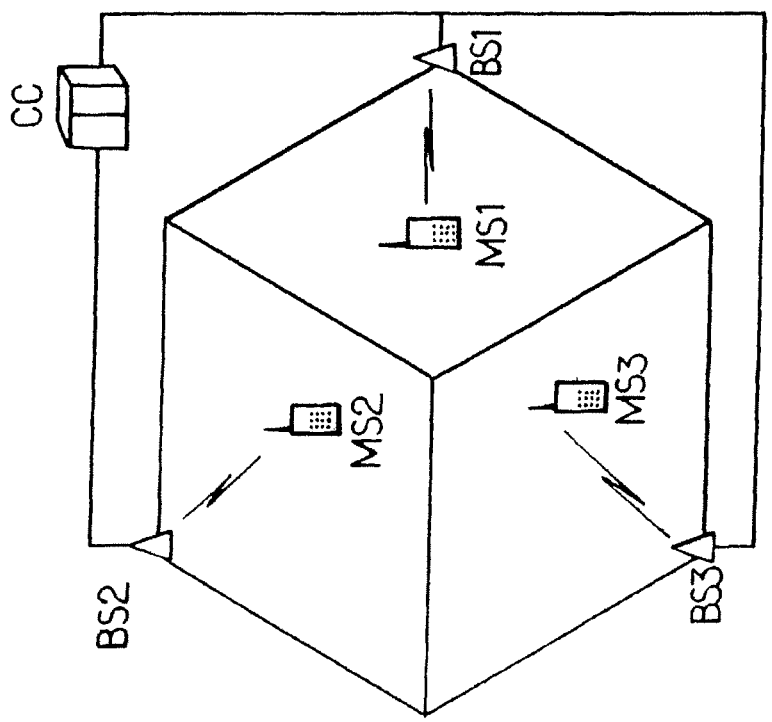
FIG. 1A illustrates the step of transmission channel estimation by prior art terminals.
Figure 2B:
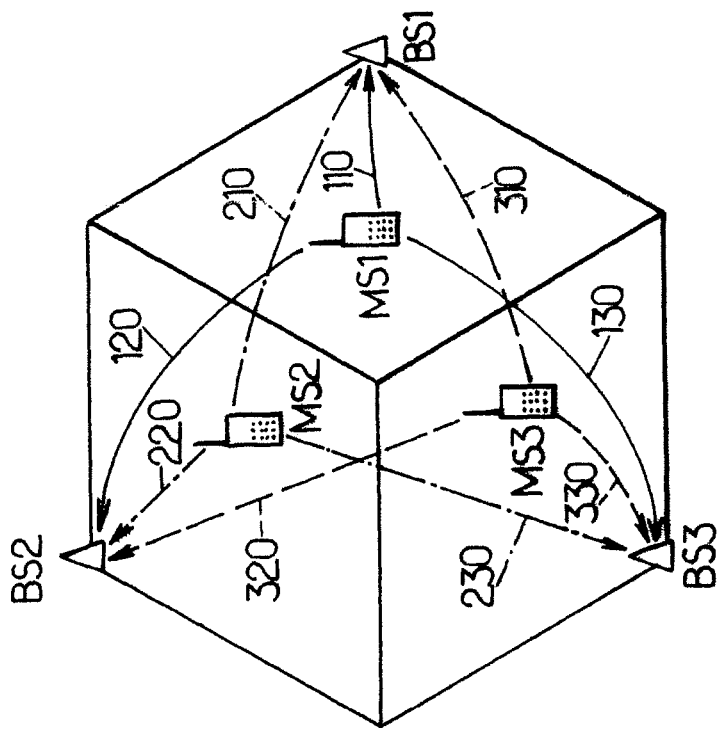
FIG. 2B illustrates the step of communication of transmission channel information by terminals of the invention.
Figure 2A:
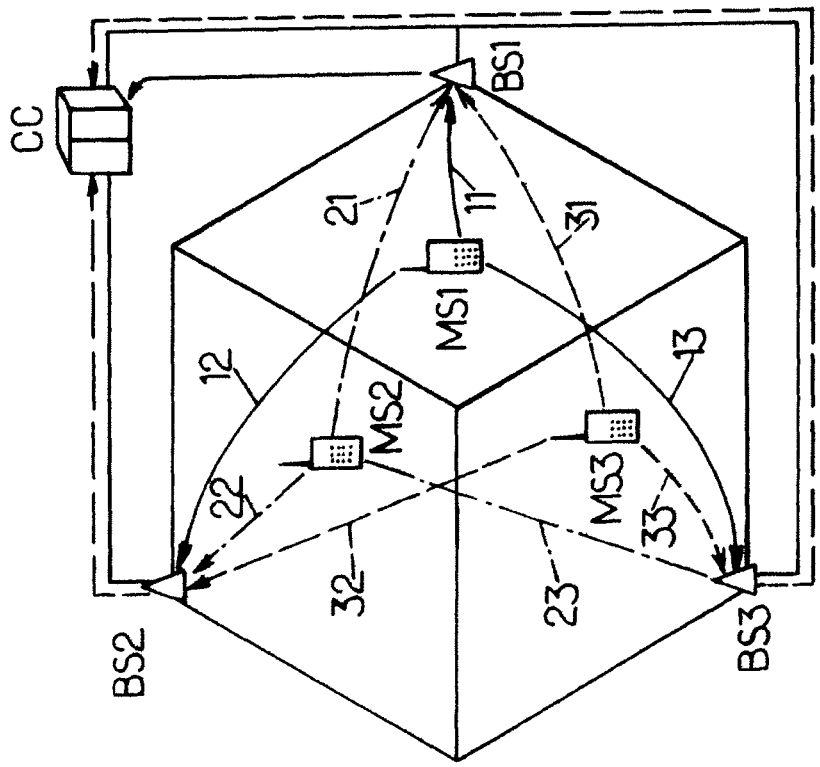
FIG. 2A illustrates the step of communication of transmission channel information by prior art terminals.
Figure 3B:
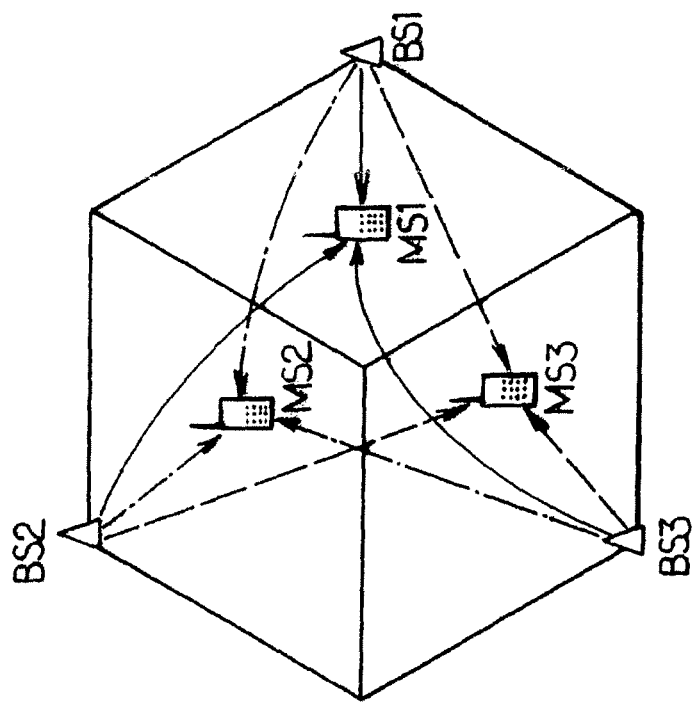
FIG. 3B illustrates the step of the invention of transmission of the signal by the base stations to the terminals.

Refer now to the drawings, which compare the first, second, and third stages of the prior art (FIGS. 1A, 2A, 3A), with the corresponding stages of the invention (FIGS. 1B, 2B, 3B, respectively).

The same references in the drawings designate the same elements from one figure to another.

The CI on the transmission channels between a terminal MSi and a base station BSj is below denoted $h_{i,j}$.

The first stage illustrated by FIGS. 1A and 1B aims to have each user terminal MS1, MS2, MS3 estimate the channels that connect it to each base station BS1, BS2, BS3. Each terminal MSi estimates the CI ($h_{i,1}$, $h_{i,2}$, $h_{i,3}$). Note in FIG. 1A relating to the prior art that each base station is connected to a central controller CC and that this controller may be omitted in FIG. 1B relating to the invention. Apart from this, the respective first stages of the prior art and of the invention may be identical, in particular in so far as estimating the channel is concerned.

Refer next to FIGS. 2A and 2B. In the second stage of the prior art technique (FIG. 2A), the terminals transmit on the return path of each base station of the cluster CI local to that base station. Each terminal MSi transmits the information $h_{i,j}$ over the return path to each base station BSj.

The arrows 11, 12, and 13 respectively represent transmission from the terminal MS1 of the information $h_{1,1}$ to the base station BS1, the information $h_{1,2}$ to the base station BS2, and the information $h_{1,3}$ to the base station BS3.

The arrows 21, 22, and 23 respectively represent transmission from the terminal MS2 of the information $h_{2,1}$ to the base station BS1, the information $h_{2,2}$ to the base station BS2, and the information $h_{2,3}$ to the base station BS3.

The arrows 31, 32, and 33 respectively represent transmission from the terminal MS3 of the information $h_{3,1}$ to the base station BS1, the information $h_{3,2}$ to the base station BS2, and the information $h_{3,3}$ to the base station BS3.

The base stations then transmit the local CI received from all the terminals to the central controller CC of the cluster using the appropriate links between the base stations and the central controller.

In contrast, in the context of the invention (FIG. 2B), the terminals may transmit their local and non-local CI to all the base stations of the cooperation cluster over the return path. Each terminal MSi transmits to each base station BSj the CI $h_{i,1}$, the CI $h_{i,2}$, and the CI $h_{i,3}$. For greater clarity the information from the CI $h_{i,1}$, the CI $h_{i,2}$, and the CI $h_{i,3}$ is below denoted ($h_{i,1}$, $h_{i,2}$, $h_{i,3}$).

The arrows 110, 120, and 130 respectively represent the transmission of the information ($h_{1,1}$, $h_{1,2}$, $h_{1,3}$) from the terminal MS1 to the base stations BS1, BS2, and BS3.

The arrows 210, 220, and 230 respectively represent the transmission of the information ($h_{2,1}$, $h_{2,2}$, $h_{2,3}$) from the terminal MS2 to the base stations BS1, BS2, and BS3.

The arrows 310, 320, and 330 respectively represent the transmission of the information ($h_{3,1}$, $h_{3,2}$, $h_{3,3}$) from the terminal MS3 to the base stations BS1, BS2, and BS3.

In FIG. 2B, for example, the terminals may transmit their estimate of the channels to all the base stations of the cooperation cluster on the return path, with an appropriate power and an appropriate modulation and coding scheme so that all the base stations of the cluster are able to decode the message. Thus all the base stations of the cluster assemble the CI from the terminals covered by all the base stations of the cluster.

Figure 3A:
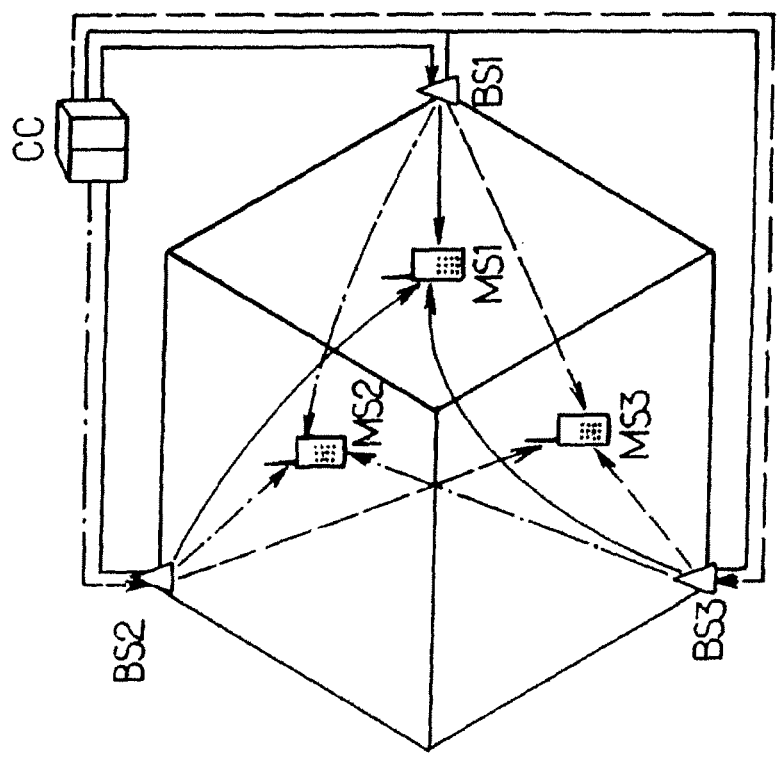
FIG. 3A illustrates the prior art step of transmission of the signal by the base stations to the terminals.

Moreover, the third stage in the prior art (FIG. 3A) is also modified in the invention (FIG. 3B). In FIG. 3A (prior art), users are scheduled by the central controller. The central controller CC also chooses the transmission parameters for each selected user and sends the corresponding information to each base station.

In contrast, in the third stage of the invention, each base station decides on the scheduling of users without communicating with the other base stations of the cluster. Because all the base stations of the cluster are synchronized and use the same scheduling algorithm, they decide on the same order of servicing the terminals and thus jointly select the same terminals. Each base station also determines the transmission parameters to use for each selected terminal without communicating with the other base stations, which transmission parameters may take account of the CSI between the selected terminals and all the base stations of the cluster.

Thus each base station may take decisions on scheduling user terminals without communicating with the other base stations of the cluster. Because all the base stations of the cluster are in particular synchronized, have the same CI, and use the same scheduling algorithm, they schedule the terminals in the same way. It follows that each base station may determine the transmission parameters to use for the selected terminals without communicating with the other base stations of the cluster. Moreover, as a function of the CSI, these transmission parameters may be optimized between the selected terminals and all the base stations of the cluster. Examples are described below to explain this optimization.

Clearly scheduling in the sense of the invention is decentralized: different base stations may take the same scheduling decisions without communicating with each other, which is made possible by the fact that each has the information from the CI of all the terminals covered by the cluster and uses the same scheduling algorithm. Note that decentralized scheduling yields the same performance as centralized scheduling because the CI and the algorithm used are the same.

Decentralized scheduling may be implemented in two ways.

Firstly, there is Round Robin scheduling, which consists in servicing all the terminals turn and turn about. This scheduling may be effected in a decentralized manner as follows.

It is assumed that each terminal is identified by a unique number (which is generally so in practice). Each base station establishes a list of the terminals to be serviced in the coverage area of the cluster, for example in increasing terminal number order (which order may be predefined in the parameters of the base station). This list is then the same for each base station of the cluster. For all the base stations of the cluster to service the same group of terminals at the same time, it suffices for the base stations to read the list in the same manner. To this end, the base stations may for example be forced to service the first group of terminals from the list on reception of a synchronization signal sent periodically by the network. Remember that the base stations are synchronized.

Each base station is then required to service the next group of terminals in the above-mentioned list in each new TTI. Thus each base station chooses the same terminals in each TTI.

To use SDMA and to service two terminals at once, for example, the list may be read group by group where a group comprises two terminals: for example, at TTI n, the base stations service the first two terminals from the list and at TTI n+1 the base stations service the third and fourth terminals, and so on. The number of terminals to be serviced in each TTI may be predefined in the configuration of the base stations or may be decided on by the base station in each TTI as a function of the CI.

In particular, the number of terminals to be serviced in each TTI may be equal to one if there is no requirement to use SDMA; in this situation, one terminal at a time is serviced in each TTI.

In a variant applied to the situation of using a scheduling algorithm aiming to maximize the signal-to-interference plus noise ratio in the serviced terminals, the terminal that is serviced in each TTI is that which has sent back via the return path the best quality of service evaluated from the CQI. This channel quality may be defined by a signal-to-interference plus noise ratio, for example, where the power of the signal is the sum of the powers received from each base station of the cluster and where the power of the interference is the sum of the powers received from the base stations that do not belong to the cluster. In another variant, the terminal sends back a signal-to-interference plus noise ratio for each base station of the cluster, where the power of the signal is the power received from the base station concerned and where the power of the interference is the sum of the powers received from the other base stations. As the invention entails a terminal sending the same information over the return path to all the base stations of the cluster, the terminal that sends back the best channel quality (as evaluated from the CQI) is the same for each base station of the cluster. Each base station of the cluster therefore services the same terminal in each TTI.

In this variant, it is equally possible to service a plurality of terminals in the same TTI. For example, to service two terminals in each TTI, the terminals selected are those that have sent back via the return path the best two channel qualities as evaluated from the CQI.

Once the scheduler has selected the terminal or terminals to be serviced, the transmission parameters may be optimized as a function of the CSI of all the terminals covered by the cooperation cluster (local CSI and non-local CSI).

For example, if the CSI is made up of the coefficients of the transmission channels, a linear precoding matrix may be calculated to form channels according to the zero-forcing beam-forming criterion. As all the base stations of the cooperation cluster have the same CSI, each base station calculates the same matrix. Each base station then applies to the signal transmitted by each of its antennas the weighting coefficients given by the rows corresponding to this base station in the calculated matrix. Thus zero-forcing beam-forming may be used for multicellular cooperative communication without needing communication between the base stations of the cluster or between the base stations of the cluster and a central controller.

In another implementation, linear precoding is based on fixed beams. The CSI sent on the return path by each terminal may then consist, for a given base station of the cooperation cluster, of information on the beam received with the maximum power by that terminal. For example, if the cluster is formed of three base stations, the terminal may send via the return path three integers, the first integer representing the number of the beam received with the maximum power from the first base station, the second integer representing the number of the beam received with the maximum power from the second base station, and the third integer representing the number of the beam received with the maximum power from the third base station. If it is required to service only one terminal in each TTI, then each base station of the cluster services the terminal selected by the scheduler, for example by means of one or the other of the scheduling algorithms described above, using the beam indicated by the terminal as being received with the maximum power relative to this base station.

In another variant, scheduling may also depend on the CSI. For example, if it is required to service two terminals in each TTI using SDMA, the decisions as to the terminals to be serviced in each TTI may be optimized using the CSI in order to minimize the interference created at the second terminal by the signal going to the first terminal and the interference created at the first terminal by the signal going to the second terminal.

There is described below an implementation of such scheduling when transmitting fixed beams for two terminals serviced in each TTI using SDMA.

The scheduling described is based on a Round Robin algorithm as described above, modified in the following manner to take the CSI into account. Each base station establishes a list of the terminals to be serviced in the coverage area of the cluster as described above. Each base station then makes a copy of this list, which is referred to below as the current list. In each new TTI, each base station selects the first terminal in the current list and assigns it the fixed beam that it has indicated as being received with the maximum power from base station. In contrast, each base station knows the fixed beams received with the maximum power by the selected first terminal from the other base stations of the cluster. To select the second terminal to be serviced using the same blocks of resources as the first terminal, each base station successively examines each next terminal in the current list, and selects the first one that has indicated via the return path beams received with the maximum power that are all different from the beams assigned to the selected first terminal. In other words, no base station is authorized to service more than one terminal in a given TTI using the same beam. Once the two terminals to be serviced in a TTI have been selected, each base station services the two terminals using for each of them the beam indicated as being received with the maximum power from the base station. The two terminals that have been serviced are then eliminated from the current list, after which each base station recommences the process in the next TTI by selecting the first terminal from the current list. Note that the current list is therefore reduced by two terminals compared to the current list in the preceding TTI. When the current list is empty, all the terminals covered by the cluster have been serviced. Each base station then creates a new current list by copying the original list and then recommences the process. Note that it may sometimes be impossible to find a second terminal to service in a TTI, with the result that none of the beams assigned to the selected first terminal is re-used. In this situation, the choice may be made to service only the first terminal in this TTI.

The invention claimed is:

1. A method of wireless telecommunication wherein an access point transmits a signal to at least one terminal via a transmission channel;
the telecommunications method being used in a system comprising at least:
first and second access points;
first and second terminals that may be serviced by said first and second access points; and
the first terminal being adapted to estimate first transmission channels between said first terminal and said first and second access points and the second terminal being adapted to estimate second transmission channels between said second terminal and said first and second access points;
and wherein:
the first and second access points schedule the servicing of the terminals according to a predetermined criterion common to the first and second access points;
a cooperation cluster comprising at least said access points jointly servicing said terminals is defined;
said system further comprises one or more access points not belonging to said cooperation cluster;
the method comprising:
a. estimating, by the first terminal, said first transmission channels, and, by the second terminal, said second transmission channels;
b. communicating to the first and second access points a first indication concerning said first transmission channels by said first terminal and a second indication concerning said second transmission channels by said second terminal;
c. independently scheduling said servicing of the terminals by the first and second access points using transmission parameters based on said first and second indications; and
d. jointly servicing said terminals by the first and second access points;

wherein:
the first indication and the second indication respectively comprise information relating to a signal-to-interference plus noise ratio associated with the first and second terminals; and
the power of the signal in a signal-to-interference plus noise ratio associated with the terminal is defined as a sum of powers received by said terminal from the access points belonging to the cooperation cluster and power of interference in a signal-to-interference plus noise ratio associated with a terminal is defined as a sum of the powers received by said terminal from the access points not belonging to said cooperation cluster.

2. The method according to claim 1, wherein the first and second access points jointly service at least two terminals simultaneously.

3. The method according to claim 1, wherein said common predetermined criterion is based on said first and second indications on the first and second channels.

4. The method according to claim 1, wherein:
the first and second access points respectively establish first and second lists of terminals covered by the first and second access points;
said first and second lists are classified in a common order; and
the first and second access points schedule successive servicing of the terminals according to their classification in the list by groups comprising at least one terminal.

5. The method according to claim 4, wherein a unique number is assigned for identifying the terminals, and said first and second lists are classified in an order that is a function of the numbers identifying the terminals.

6. The method according to claim 1, wherein said first indication and said second indication comprise information on the coefficients of the transmission channels.

7. The method according to claim 6, wherein a same matrix is calculated by the first and second access points based on the coefficients of the transmission channels, wherein said matrix comprises a plurality of rows of weighting coefficients, wherein at least one row of said matrix is associated with each of the said first and second access points and wherein for each access point, servicing the first and second terminals is ordered according to the weighting coefficients of the row associated to said access point.

8. The method according to claim 1, wherein said first indication and said second indication comprise information on a signal-to-interference plus noise ratios of the transmission channels.

9. The method according to claim 8, wherein said first indication and said second indication comprise information on signal-to-interference plus noise ratios of said first and second transmission channels, and said common criterion for scheduling servicing of the terminals is such that at least one terminal of which one transmission channel has a maximum ratio of signal-to-interference plus noise is serviced.

10. The method according to claim 1, wherein said first indication and said second indication each comprise information on a first beam that may be rendered active by the first access point and a second beam that may be rendered active by the second access point, said first and second beams being receivable by the terminal with a maximum power.

11. A non-transitory computer program product stored in a memory of a module of an access point to a telecommunications system, comprising instructions for executing the method according to claim 1 when the program is executed by a processor of such a module.

12. A telecommunication system comprising at least:
first and second access points;
first and second terminals that may be serviced by said first and second access points; and
the first terminal for estimating first transmission channels between said first terminal and said first and second access points and the second terminal for estimating second transmission channels between said second terminal and said first and second access points;
wherein:
the first and second access points comprise a homologous processor for scheduling the servicing of the terminals according to a predetermined criterion common to the first and second access points;
a cooperation cluster comprising at least said access points jointly servicing said terminals is defined;
said system further comprises one or more access points not belonging to said cooperation cluster;
and wherein:
the first terminal estimates said first transmission channels and the second terminal estimates said second transmission channels;
the first terminal communicates to the first and second access points a first indication concerning the first transmission channels and the second terminal communicates to the first and second access points a second indication concerning the second transmission channels;
the first and second access points independently schedule said servicing of the terminals using transmission parameters based on said first and second indications;
the first and second access points jointly service the first and second terminals;
the first indication and the second indication respectively comprise information relating to a signal-to-interference plus noise ratio associated with the first and second terminals; and
the power of the signal in a signal-to-interference plus noise ratio associated with the terminal is defined as a sum of powers received by said terminal from the access points belonging to the cooperation cluster and power of interference in a signal-to-interference plus noise ratio associated with a terminal is defined as a sum of the powers received by said terminal from the access points not belonging to said cooperation cluster.

13. An access point of a telecommunication system comprising:
said access point and a second access point;
a first terminal and a second terminal that may be serviced by said access point and said second access point;
the first terminal being adapted to estimate first transmission channels between said first terminal and said access point and between said first terminal and said second access point and the second terminal being adapted to estimate second transmission channels between said second terminal and said access point and between said second terminal and said second access point;
said first terminal estimating first transmission channels and said second terminal estimating second transmission channels;
wherein said access point schedules the servicing of the terminals according to a predetermined criterion common to the first and second access points;
wherein a cooperation cluster comprising at least said access points jointly servicing said terminals is defined;
wherein said system further comprises one or more access points not belonging to said cooperation cluster;
and wherein said access point comprises:
means for receiving a first indication on the first transmission channels and a second indication on the second transmission channels;
means for independently scheduling with said second access point said servicing of the terminals using transmission parameters based on said first and second indications; and
means for jointly servicing with said second access point said first and second terminals;
the first indication and the second indication respectively comprise information relating to a signal-to-interference plus noise ratio associated with the first and second terminals; and
the power of the signal in a signal-to-interference plus noise ratio associated with the terminal is defined as a sum of powers received by said terminal from the access points belonging to the cooperation cluster and power of interference in a signal-to-interference plus noise ratio associated with a terminal is defined as a sum of the powers received by said terminal from the access points not belonging to said cooperation cluster.

* * * * *